June 10, 1958  T. B. DALTON  2,838,324
UPPER FIFTH WHEEL WITH PLURAL ADAPTERS
FOR REMOVABLE KING PIN
Filed Aug. 9, 1956  3 Sheets-Sheet 1
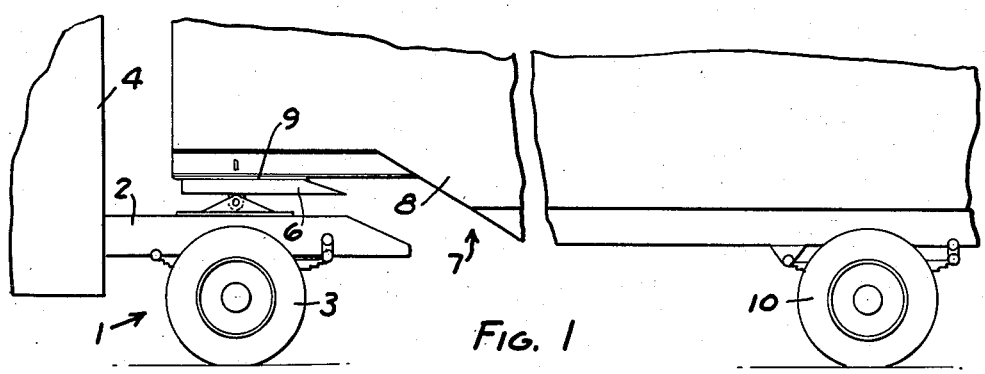
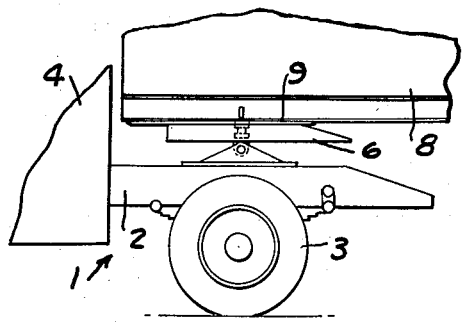
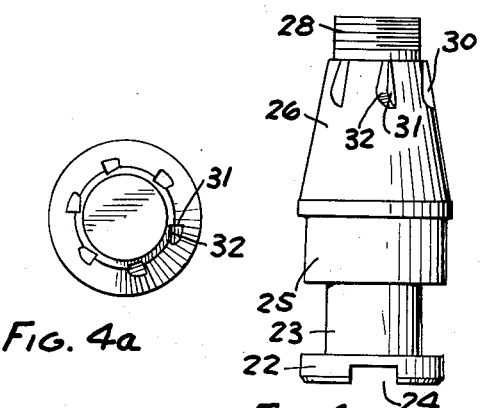
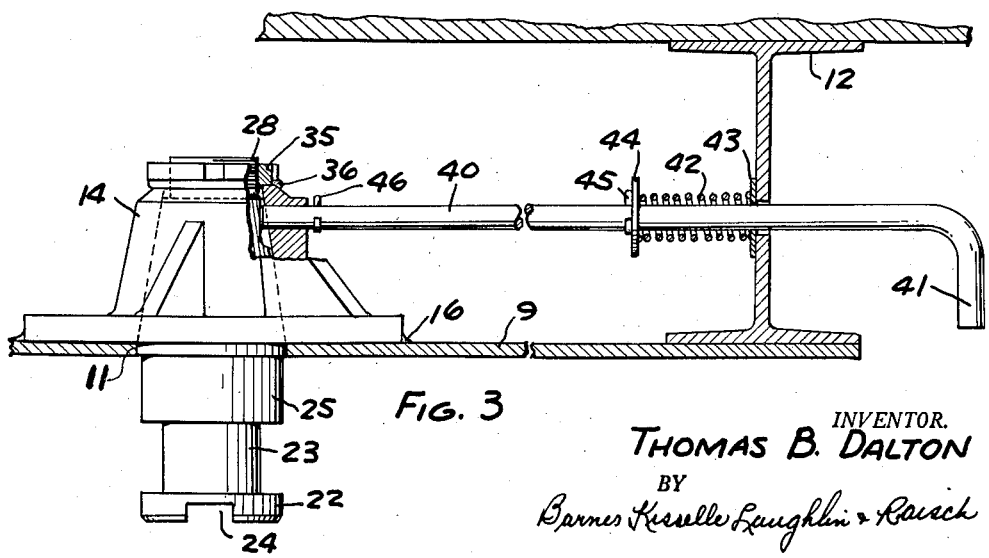
INVENTOR.
THOMAS B. DALTON
BY
Barnes, Kisselle, Laughlin & Raisch
ATTORNEYS.

INVENTOR.
THOMAS B. DALTON
BY
ATTORNEYS.

June 10, 1958 T. B. DALTON 2,838,324
UPPER FIFTH WHEEL WITH PLURAL ADAPTERS
FOR REMOVABLE KING PIN
Filed Aug. 9, 1956 3 Sheets-Sheet 3

INVENTOR.
THOMAS B. DALTON
BY
ATTORNEYS.

United States Patent Office 2,838,324
Patented June 10, 1958

2,838,324

UPPER FIFTH WHEEL WITH PLURAL ADAPTERS FOR REMOVABLE KING PIN

Thomas B. Dalton, Muskegon, Mich., assignor to West Michigan Steel Foundry Co., Muskegon, Mich., a corporation of Michigan Application August 9, 1956, Serial No. 603,015

10 Claims. (Cl. 280—407)

This invention relates to road vehicles of the tractor-semi-trailer type. Such vehicles customarily employ a fifth wheel type of connection. There is a lower fifth wheel member on the tractor provided with a socket and coupling means to receive and couple to a king pin depending from the underside of an upper fifth wheel member or skid plate on the underside of the semi-trailer.

This invention has to do with the king pin construction on the semi-trailer. In accordance with this invention a king pin structure is provided so that the king pin may be removed and replaced by operations performed entirely exteriorly of the semi-trailer without requiring the removal of any of the flooring, the upper fifth wheel member or skid plate, or any other structural parts of the semi-trailer. The semi-trailer is provided with a securing device which may be termed an adapter for removably receiving the king pin and the king pin is constructed so that it may be manipulated and be easily mounted or removed. Accordingly, one object of the invention is to provide a readily removable and replaceable king pin.

Moreover, the semi-trailer may be provided with a plurality of adapters spaced lengthwise from each other so that the king pin can be mounted in a plurality of selected positions with the positions varying in a fore and aft direction. Thus, the trailer may be coupled to the tractor in positions which vary relative to the tractor so that the load supported by the tractor wheels may be varied or adjusted. This is a further object of the invention.

Structures made in accordance with the invention are shown in the accompanying drawings:

Fig. 1 is a somewhat diagrammatic view illustrating the rear end of the tractor and a forward end of a semi-trailer coupled together by the so-called fifth wheel.

Fig. 2 is a view similar to Fig. 1 illustrating the same tractor and semi-trailer but showing the semi-trailer coupled in a more forward position.

Fig. 3 is an enlarged view partly in cross section showing the adapter and king pin assembly and a safety latching device.

Fig. 4 is an elevational view of the king pin.

Fig. 4a is a top plan view of the king pin.

Tractor-semi-trailer vehicles are well known to those skilled in the art and so details thereof need not be described. Suffice it to say that the tractor 1 in Fig. 1 has a frame 2 with ground engaging wheels 3 and a cab 4.

Figure 5:
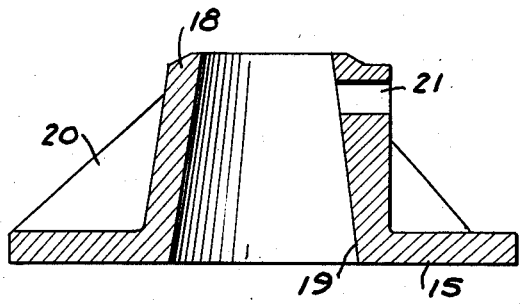
Fig. 5 is a cross sectional view of the adapter.
Figure 6:
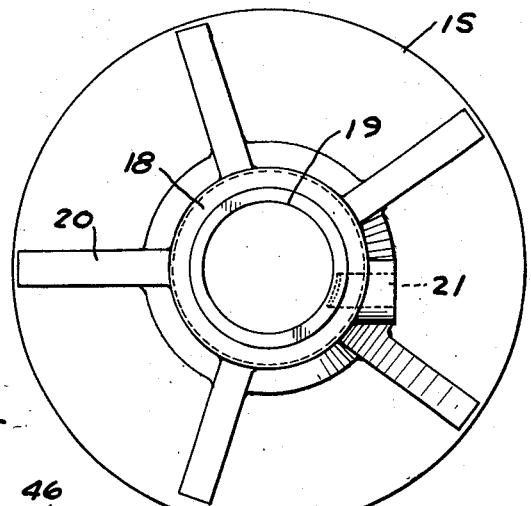
Fig. 6 is a plan view of one form of adapter.

Mounted on the rear end of the tractor is a rocking fifth wheel member 6. The trailer 7 has a trailer body indicated at 8 and it is provided with an upper fifth wheel member or skid plate 9 from which depends a king pin for moving into and coupling with the coupling means in the lower fifth wheel member 6. The trailer has rear ground engaging wheels 10. As indicated in Fig. 3 the skid plate or upper fifth wheel member 9 may be attached to the frame elements 12 of the semi-trailer. The upper fifth wheel member has an aperture 11. Mounted on the plate 9 is a device for receiving a king pin and which may be conveniently called an adapter, as generally shown at 14. This adapter (Figs. 5 and 6) is provided with a base 15 which may be welded to the plate 9 as at 16. The base may be circular at shown. It has a central portion 18 provided with a socket 19 preferably of tapered form. Gussets 20 may be embodied in the structure for reinforcing purposes and the adapter may be of one integral piece of cast steel. The central portion is provided with an opening 21 which leads to the socket.

The king pin (Fig. 4) is provided with a head 22 which defines a restricted or ensmalled portion 23 which receives the coupling means (not shown) on the lower fifth wheel. The underside of the head 22 is provided with a transverse groove 24 for purposes which will presently appear. The king pin has an intermediate portion 25 and an upper portion 26 of tapered form so as to fit snugly in the socket 19 of the adapter. The extreme upper end of the king pin is threaded as at 28. The king pin is provided preferably near the upper end of the tapered portion 26 with a plurality of notches 30. These notches are formed on one side with substantially straight walls 31 and on the opposite side with inclined walls or surfaces 32.

A nut 35 is placed on the top of the adapter (Fig. 3) and is securely fastened thereto as by means of welding as at 36 and the nut has internal threads.

There is a locking shaft 40 with its inner end slidably received in the aperture 21. This locking shaft extends laterally through an opening in frame member 12 and has a laterally extending end 41 which serves as a handle. A coil spring 42 acts upon the locking shaft to project its inner end into the socket 19. The spring 42 may react against the frame member 12 through an interposed washer 43 and may act upon the shaft through the means of a washer 44 held by a cotter pin or the like 45. A cotter pin or similar projection 46 may be mounted adjacent the inner end of the locking shaft to limit the inward movement of the locking shaft under the action of the spring 42 when the king pin is not in the socket. When the king pin as assembled to the adapter the structure appears as indicated in Fig. 3.

Figure 7:
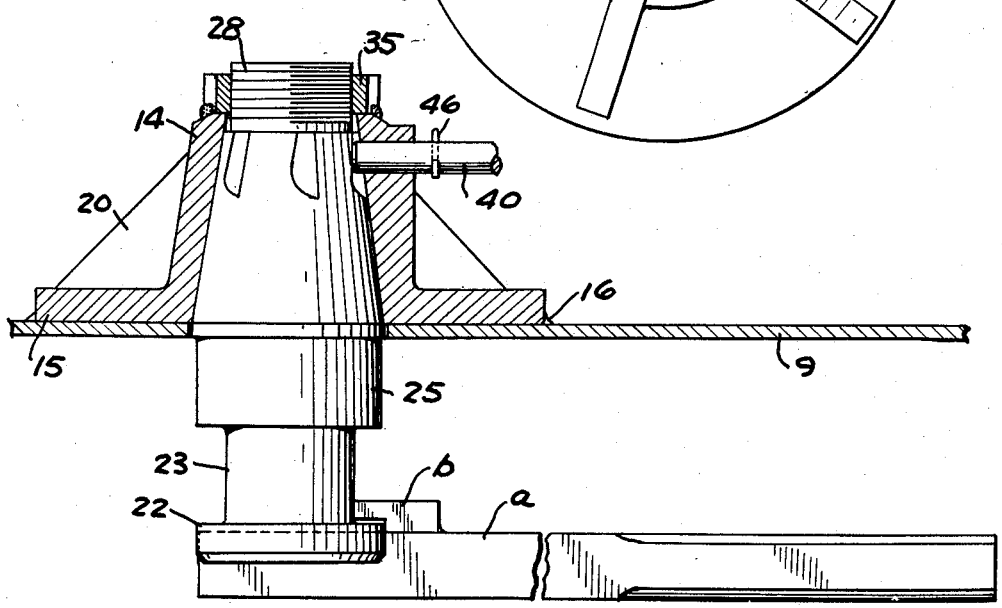
Fig. 7 is a view showing the adapter and king pin in assembly and illustrating a tool applicable to the king pin.

When the king pin is assembled the shaft 40 should be retracted at least until the threads are engaged. Thereafter the shaft 40 may be released and as the king pin is turned on its axis the notches 30 move across the end of the shaft in the fashion of a ratchet. If, in final position, one of the notches 30 is not in alignment with the shaft 40 the king pin cannot nevertheless be disengaged because a slight turning movement in the unthreading direction will cause the abrupt wall of one of the notches to engage the shaft 40. The king pin may be manipulated by a tool, as shown in Fig. 7. This tool has a body *a* which can be received in the notch 24 and an overhanging lip *b* which laps over the head 22 to hold the tool in position. When the king pin is being removed the shaft 40 must be held retracted.

Figure 8:
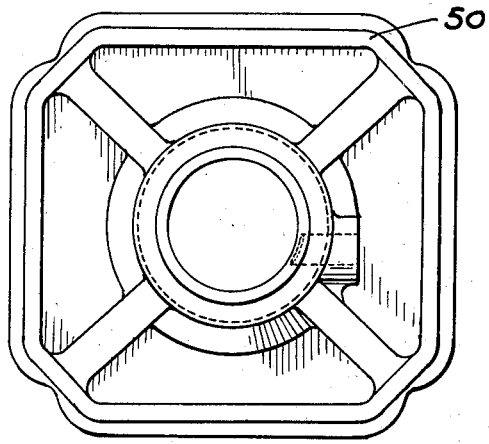
Fig. 8 is a plan view of a modified form of adapter.
Figure 9:
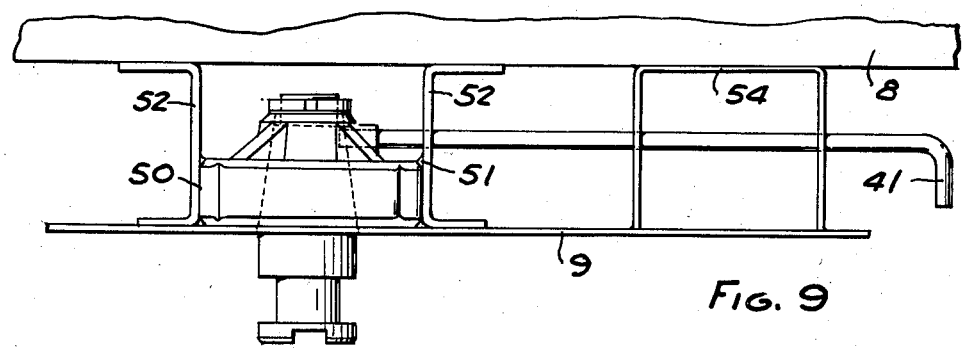
Fig. 9 is a view illustrating the mounting for the modified form of adapter.

A modified form of adapter is shown in Figs. 7 and 8. Those parts which are the same as the ones previously described have the same reference characters applied thereto. The modified adapter has a rectangular or square body 50 of some height as shown in Fig. 9. This adapter is one which can be welded as at 51 to frame members 52 overlying the skid plate or upper fifth wheel member 9. The king pin and locking shaft and related parts are the same as those previously described. However, Fig. 9 illustrates a frame member 54 of inverted channel form as distinguished from the I-beam member shown in Fig. 3.

Figure 10:
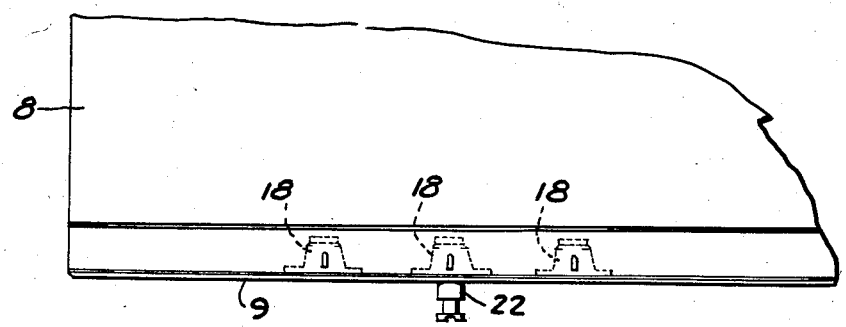
Fig. 10 is a view partly in cross section showing the upper fifth wheel member or skid plate with a plurality of adapters thereon for selectively receiving a king pin.

As illustrated in Fig. 10 the upper fifth wheel member or skid plate 9 of the trailer body may be provided with a plurality of adapters spaced lengthwise from each other. Three adapters are shown in Fig. 10 and the king pin may be selectively mounted in any one of the adapters. This results in a situation where, for example, the central adapter, if used with the king pin, positions the trailer in what might be considered in an intermediate or normal position, as shown in Fig. 1. If the king pin is used in the rearward adapter, the body of the trailer is positioned forwardly relative to the tractor. This would put more weight on the tractor wheels. If the forward adapter is employed, the trailer body when coupled to the tractor is rearward of the position shown in Fig. 1 thus lessening the load on the tractor wheels.

This construction thus gives some latitude in selecting the relative positions to the tractor and trailer. Of course, clearance between the front end of the trailer and the cab 4 of the body is a factor which must also be considered. Some tractors may be constructed to permit of a position of the trailer more forward than other tractors. Also, the type of material which the trailer is expected to carry is a factor which has a bearing on the selection of the king pin. For example, some enterprises own and operate their own equipment, and own merchandise and loads which are to be transported depending upon the goods, wares and merchandise of the enterprise. Some equipment is used with bulky relatively light materials, while others may be used with more compact heavy materials. The king pin position may be selected which is best for the materials to be handled. Of course, if the king pin becomes unduly worn or damaged it may be replaced and such replacement can be carried out without the necessity of removing any structural part of the trailer.

I claim:

1. In a semi-trailer for use with a tractor having a lower fifth wheel member comprising, a trailer body, an upper fifth wheel member on the underside of the trailer body adapted to rest upon the lower fifth wheel member, said upper fifth wheel member having an aperture therein, an adapter member secured in position above the upper fifth wheel member in substantial alignment with said aperture, a king pin member, the adapter member and king pin member having one a socket and the other a part fitting in said socket, the king pin member having a portion depending from the adapter and extending below the upper fifth wheel member for coupling with the lower fifth wheel member on the tractor, screw threads on the adapter member and king pin member detachably securing them together, and a releasable locking device carried by one member and engaging the other member to hold the members against relative rotation to prevent disengagement by relative turning.

2. In a semi-trailer for use with a tractor having a lower fifth wheel member comprising, a trailer body, an upper fifth wheel member on the underside of the trailer body adapted to rest upon the lower fifth wheel member, said upper fifth wheel member having an aperture therein, and an adapter member having a socket secured in position above the upper fifth wheel member with its socket in substantial alignment with said aperture, said adapter having threads, a king pin having a portion for fitting in said socket, and having a portion depending from the socket below the upper fifth wheel member for coupling with the lower fifth wheel member on the tractor, said king pin having threads in detachable threaded engagement with those on the adapter member, said adapter member including means for slidably receiving a locking member, and a locking member received by said means and engaging the king pin to hold the king pin against turning, said locking member being slidably retractable to release said king pin for turning.

3. The structure as recited in claim 2 characterized in that the depending part of the king pin is provided with a formation for receiving a tool for turning the king pin.

4. In a semi-trailer for use with a tractor having a lower fifth wheel member comprising, a trailer body, an upper fifth wheel member on the underside of the trailer body adapted to rest upon the lower fifth wheel member, said upper fifth wheel member having an aperture therein, and an adapter member having a socket secured in position above the upper fifth wheel member with its socket in substantial alignment with said aperture, said adapter having threads, a king pin having a portion for fitting in said socket, and having a portion depending from the socket below the upper fifth wheel member for coupling with the lower fifth wheel member on the tractor, said king pin having threads for threaded engagement with those on the adapter member, said king pin having an annular array of notches therein, said adapter member including means for slidably receiving a locking member, and a spring pressed locking member positioned slidably and transversely in said means for engaging a notch in the king pin.

5. The structure as recited in claim 4 characterized in that the annular array of notches are of the ratchet type each having an abrupt wall and an inclined wall, whereby the king pin may be threadedly secured to the adapter member by turning with the notches thereof ratcheting past the locking member.

6. In a semi-trailer for use with a tractor having a lower fifth wheel member comprising, a trailer body, an upper fifth wheel member on the underside of the trailer body adapted to rest upon the lower fifth wheel member on the tractor, the upper fifth wheel member having a plurality of apertures therein spaced lengthwise of the trailer body, a plurality of adapters each secured in position above the upper fifth wheel member and each in substantial alignment with one of said apertures, a king pin, the king pin and each adapter having interfitting parts so that the king pin may be selectively interfitted with one of the adapters, said king pin having a portion depending from the selected adapter and below the upper fifth wheel member for coupling with the lower fifth wheel member on the tractor, and means for detachably securing the king pin to the selected adapter.

7. In a semi-trailer for use with a tractor having a lower fifth wheel member comprising, a trailer body, an upper fifth wheel member on the underside of the trailer body adapted to rest upon the lower fifth wheel member on the tractor, the upper fifth wheel member having a plurality of apertures therein spaced lengthwise of the trailer body, a plurality of adapters each secured in position above the upper fifth wheel member and each in substantial alignment with one of said apertures, a king pin, the king pin and each adapter having interfitting parts so that the king pin may be selectively interfitted with one of the adapters, said king pin having a portion depending from the selected adapter and below the upper fifth wheel member for coupling with the lower fifth wheel member on the tractor, and screw threads on each adapter and on the king pin for securing the king pin to a selected adapter.

8. In a semi-trailer for use with a tractor having a lower fifth wheel member comprising, a trailer body, an upper fifth wheel member on the underside of the trailer body adapted to rest upon the lower fifth wheel member on the tractor, the upper fifth wheel member having a plurality of apertures therein spaced lengthwise of the trailer body, a plurality of adapters each secured in position above the upper fifth wheel member and each in substantial alignment with one of said apertures, a king pin, the king pin and each adapter having interfitting parts so that the king pin may be selectively interfitted with one of the adapters, said king pin having a portion depending from the selected adapter and below the upper fifth wheel member for coupling with the lower fifth wheel member on the tractor, and screw threads on each adapter and on the king pin for securing the king pin to a selected adapter, and locking means for interengaging the selected adapter member and the king pin to prevent relative rotation of the king pin on said screw threads.

9. In combination, a tractor having a lower fifth wheel member, a trailer body having an upper fifth wheel member on its underside adapted to rest upon the lower fifth wheel member on the tractor, said upper fifth wheel member having a plurality of apertures therein spaced from each other lengthwise of the trailer body and a plurality of adapter members each secured in position above the upper fifth wheel member and each in substantial alignment with one of said apertures, a king pin, each of said adapter members being adapted to selectively receive said king pin with said king pin and the selected adapter member having interfitting portions, the king pin having a portion depending from the selected adapter member and extending below the upper fifth wheel member for coupling with the lower fifth wheel member on the tractor and means for detachably securing the king pin to the selected adapter member, whereby the fore and aft position of the semi-trailer relative to the tractor may be varied in accordance with the adapter selected.

10. In a semi-trailer for use with a tractor having a lower fifth wheel member comprising, a trailer body, an upper fifth wheel member on the underside of the trailer body adapted to rest upon the lower fifth wheel member on the tractor, a plurality of adapters, means securing said adapters on each said upper fifth wheel member in positions spaced from each other lengthwise of said trailer body, a king pin, the king pin and each adapter having interfitting parts so that the king pin may be selectively interfitted with one of the adapters, said king pin having a portion depending from the selected adapter and below the upper fifth wheel member for coupling with the lower fifth wheel member on the tractor and means for detachably securing the king pin to the selected adapter.

References Cited in the file of this patent

UNITED STATES PATENTS

| | | |
|---|---|---|
| 1,951,258 | Retzlaff et al. | Mar. 13, 1934 |
| 2,070,245 | Swift | Feb. 9, 1937 |
| 2,553,959 | Cook | May 22, 1951 |
| 2,676,815 | Bennett | Apr. 27, 1954 |

FOREIGN PATENTS

| | | |
|---|---|---|
| 212,322 | Great Britain | Mar. 13, 1924 |